(12) United States Patent  
Nam

(10) Patent No.: US 7,728,497 B2
(45) Date of Patent: Jun. 1, 2010

(54) CARBON NANOTUBE, ELECTRON EMISSION SOURCE INCLUDING THE CARBON NANOTUBE, ELECTRON EMISSION DEVICE INCLUDING THE ELECTRON EMISSION SOURCE, AND METHOD OF MANUFACTURING THE ELECTRON EMISSION DEVICE

(75) Inventor: Joong-Woo Nam, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 206 days.

(21) Appl. No.: 11/272,057

(22) Filed: Nov. 14, 2005

(65) Prior Publication Data
US 2006/0238095 A1 Oct. 26, 2006

(30) Foreign Application Priority Data
Nov. 15, 2004 (KR) ............... 10-2004-0092995

(51) Int. Cl.
*H01J 9/02* (2006.01)
(52) U.S. Cl. .................. 313/310; 313/311; 313/495
(58) Field of Classification Search ......... 313/495–497, 313/309–311; 977/734, 742
See application file for complete search history.

(56) References Cited

U.S. PATENT DOCUMENTS 5,413,866 A * 5/1995 Baker et al. ............ 423/447.2
5,973,444 A * 10/1999 Xu et al. ................... 313/309
6,346,136 B1 * 2/2002 Chen et al. .................. 75/343
6,517,800 B1 * 2/2003 Cheng et al. ............ 423/447.1
6,960,334 B1 * 11/2005 Matsui et al. ........... 423/447.1
2001/0016283 A1 * 8/2001 Shiraishi et al. ........ 429/218.2
2002/0081380 A1 * 6/2002 Dillon et al. ............ 427/249.1
2002/0172767 A1 * 11/2002 Grigorian et al. ...... 427/255.28
2004/0065970 A1 * 4/2004 Blanchet-Fincher ...... 264/29.1
2004/0223901 A1 * 11/2004 Smalley et al. ......... 423/447.3
2005/0067936 A1 * 3/2005 Lee et al. .................. 313/309
2006/0208362 A1 * 9/2006 Dubin ...................... 257/762

FOREIGN PATENT DOCUMENTS

CN 1436722 8/2003

OTHER PUBLICATIONS

Chinese Certificate of Patent For Invention Cert. No. 584423 dated Dec. 30, 2009, issued for Patent #ZL200510023021.6, which corresponds to this application (#11272057).

* cited by examiner

*Primary Examiner*—Bumsuk Won
(74) *Attorney, Agent, or Firm*—H.C. Park & Associates, PLC

(57) ABSTRACT

Provided are a carbon nanotube in which a difference between a thermal decomposition initiation temperature and a thermal decomposition termination temperature is less than or equal to approximately 250° C., an electron emission source including the carbon nanotube, and an electron emission device including the electron emission source.

14 Claims, 5 Drawing Sheets

CARBON NANOTUBE, ELECTRON EMISSION SOURCE INCLUDING THE CARBON NANOTUBE, ELECTRON EMISSION DEVICE INCLUDING THE ELECTRON EMISSION SOURCE, AND METHOD OF MANUFACTURING THE ELECTRON EMISSION DEVICE

CROSS-REFERENCE TO RELATED PATENT APPLICATIONS

This application claims priority to and benefit of Korean Patent Application No. 10-2004-0092995, filed on Nov. 15, 2004, which is hereby incorporated by reference for all purposes as if fully set forth herein.

BACKGROUND OF THE INVENTION

1. Field of the Invention

The present invention relates to a carbon nanotube, an electron emission source including the carbon nanotube, and an electron emission device including the electron emission source. In particular, the present invention relates to a carbon nanotube in which a difference between a thermal decomposition initiation temperature and a thermal decomposition termination temperature is less than or equal to 250° C., an electron emission source including the carbon nanotube, and an electron emission device including the electron emission source.

2. Description of the Related Art

Electron emission devices are displays that create images by emitting light by having phosphors in a phosphor layer of an anode plate collide with electrons emitted from electron emission sources of a cathode under an electric field generated when a voltage is applied to the anode and the cathode.

Carbon-based materials, including carbon nanotubes having good electron conductivity, have properties such as a good field enhancement effect, low work function, good field emission property, low driving voltage, and an ability to be fabricated over a large area. Therefore, carbon-based materials are good electron emission sources for electron emission devices.

Korean Patent Laid-Open Publication No. 2002-0040133 discloses a method of growing carbon nanotubes for field emitters of a field emission display, e.g., a method of growing carbon nanotubes for field emitters of a field emission display, including forming a Fe—Ni or Ni—Fe alloy layer on a support substrate, forming a catalytic metal layer on the alloy layer, and growing the carbon nanotubes on the catalytic metal layer.

Japanese Patent Laid-Open Publication No. 2003-059436 discloses a cathode substrate and an anode substrate for a carbon nanotube field emission display and a method of forming a cathode substrate. According to this patent publication, the cathode substrate includes a glass substrate, a cathode layer patterned into a plurality of electron emission areas on the glass substrate, and a plurality of carbon nanotube structures grown on the electron emission areas.

Carbon nanotubes having the above-described carbon nanotube structures and other common carbon nanotube structures decompose at a temperature of approximately 400° C. or greater. The thermal decomposition of carbon nanotubes causes a loss of carbon nanotubes when the upper and lower plates are sealed during fabrication or when a carbon nanotube paste is fired, thereby reducing an amount of electron emission and a lifetime of the cathode.

SUMMARY OF THE INVENTION

The present invention provides a carbon nanotube which exhibits good purity and electron emission properties due to a small difference between a thermal decomposition initiation temperature and a thermal decomposition termination temperature thereof and exhibits good heat resistance due to a high thermal decomposition initiation temperature. The present invention also provides an electron emission source including the carbon nanotube and an electron emission device including the electron emission source.

Additional features of the invention will be set forth in the description which follows, and in part will be apparent from the description, or may be learned by practice of the invention.

The present invention discloses a carbon nanotube having a difference between a thermal decomposition initiation temperature and a thermal decomposition termination temperature of less than or equal to approximately 250° C.

The present invention also discloses an electron emission source, including a carbon nanotube having a difference between a thermal decomposition initiation temperature and a thermal decomposition termination temperature of less than or equal to approximately 250° C.

The present invention also discloses an electron emission device, including a substrate, a cathode provided on the substrate, and an electron emission source electrically coupled with the cathode formed on the substrate and comprising a carbon nanotube having a difference between a thermal decomposition initiation temperature and a thermal decomposition termination temperature of less than or equal to approximately 250° C.

The present invention also discloses a method of manufacturing an electron emission device, including preparing a composition for electron emission source formation including a carbon nanotube having a difference between a thermal decomposition initiation temperature and a thermal decomposition termination temperature of less than or equal to approximately 250° C. and a vehicle, printing the composition on a substrate, sintering the printed composition, and activating the resultant sintered product to obtain an electron emission source.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DESCRIPTION OF THE ILLUSTRATED EMBODIMENTS

Figure 1:
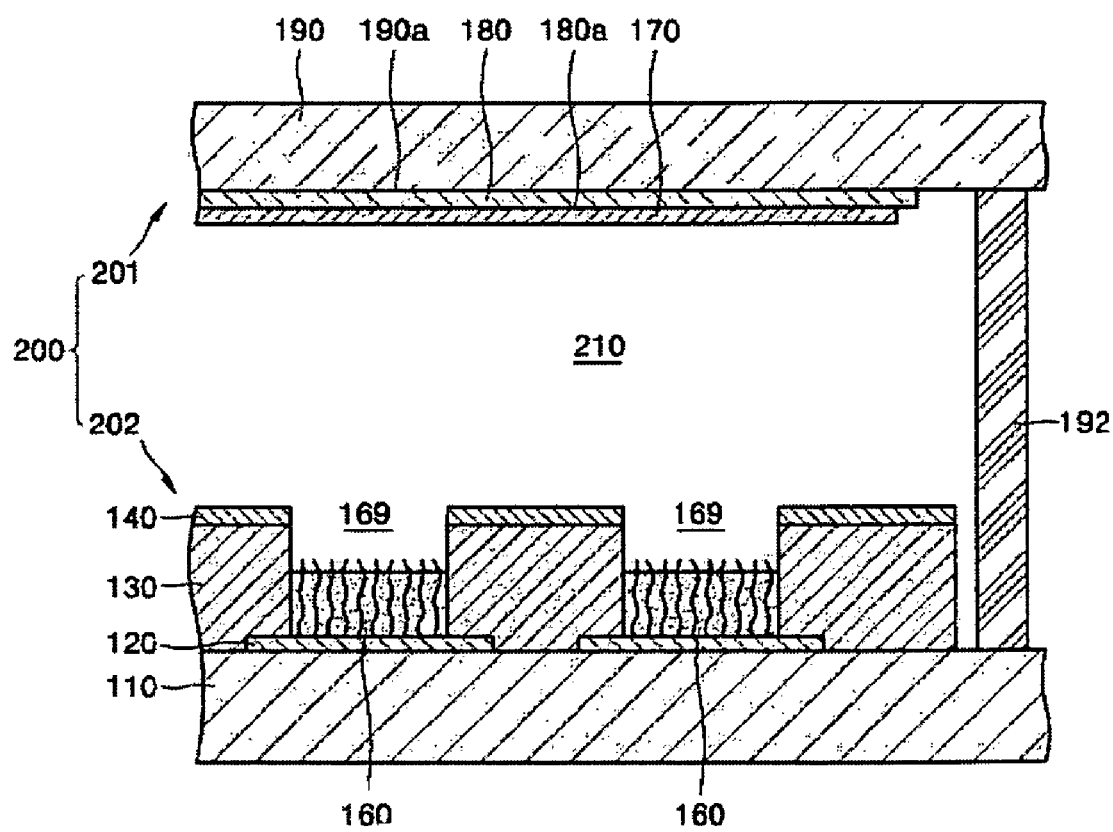
FIG. 1 is a sectional view illustrating an electron emission device according to an embodiment of the invention.

The present invention now will be described more fully hereinafter with reference to the accompanying drawings, in which preferred embodiments of the invention are shown. The present invention may, however, be embodied in many different forms and should not be construed as limited to the embodiments set forth herein According to an embodiment of the invention, there is provided a carbon nanotube in which a difference between a thermal decomposition initiation temperature and a thermal decomposition termination temperature is less than or equal to approximately 250° C.

As used herein, the phrase "thermal decomposition termination temperature" refers to a temperature where the amount of carbon nanotubes, except a catalytic metal, reaches approximately 1% of an initial amount of the carbon nanotubes. Generally, the phrase "carbon nanotubes have a high thermal decomposition initiation temperature" indicates that carbon nanotubes have a thermal resistant structure. The phrase "a difference between a thermal decomposition initiation temperature and a thermal decomposition termination temperature of carbon nanotubes is small" indicates that carbon nanotubes have a substantially uniform thermal decomposition property and a substantially uniform structural property, i.e., that carbon nanotubes have high purity. High purity carbon nanotubes provide good electron emission properties.

An embodiment of the invention provides for a carbon nanotube in which a difference between a thermal decomposition initiation temperature and a thermal decomposition termination temperature is less than or equal to approximately 25° C., which is much less than those of common carbon nanotubes used in conventional electron emission devices. The present invention also provides an electron emission source having good electron emission properties using the carbon nanotube as compared with a conventional electron emission source and an electron emission device including the electron emission source.

The carbon nanotube of the present invention may have a thermal decomposition initiation temperature of at least approximately 400° C. The carbon nanotube of the present invention with a thermal decomposition initiation temperature of at least approximately 400° C. is more heat resistance than conventional carbon nanotubes having a thermal decomposition initiation temperature of approximately 300 to 350° C.

The carbon nanotube of the present invention may be synthesized by various methods, including electric discharge, laser deposition, vaporization, thermal chemical vapor deposition, plasma enhanced chemical vapor deposition, etc. Preferably, the carbon nanotube may be synthesized by arc discharge using hydrogen gas.

The carbon nanotube of the present invention may be made according to the method described below.

A catalytic metal for growth of a carbon nanotube is provided, the catalytic metal may include cobalt, nickel, iron, or an alloy thereof. For example, the catalytic metal may be deposited to a thickness of several to hundreds of nanometers on a substrate such as glass, quartz, silicon, or alumina ($Al_2O_3$) by thermal deposition, e-beam deposition, or sputtering.

The resultant catalytic metal film is etched to form nanoscale catalytic metal particles which are separated from each other. An ammonia gas, a hydrogen gas, a hydride gas, etc., may be used as an etch gas The etch gas enables etching of the catalytic metal film along the grain boundary of the substrate to form high-density, uniform nanoscale catalytic metal particles which are separated from each other.

The catalytic metal may also be provided using a zeolite support. A catalytic metal may be combined with a zeolite support via a vacuum impregnation method or an ion exchange method. A catalyst made using a zeolite support may include a Co/Y catalyst, a Co/ZSM-5 catalyst, and a Fe/Y catalyst. For example, synthesis of a catalyst using a zeolite support may be performed using a Co or Fe acetate solution, and a final Co or Fe content may be approximately 2.5 wt %.

As described above, after a catalytic metal for growth of a carbon nanotube is provided, a carbon nanotube is grown from the catalytic metal. A carbon supply gas is a $C_{1-3}$ hydrocarbon gas, for example, acetylene, ethylene, ethane, propylene, propane, or methane gas. A carbon nanotube is generally grown at a temperature of approximately 700 to 800° C. The carbon supply gas may be supplied together with a transport gas such as a hydrogen gas or an argon gas, or a dilution gas such as a hydride gas to adjust the growth rate and time of a carbon nanotube.

It is understood that the method of synthesizing the carbon nanotube of the present invention is not limited to the above described method.

A carbon nanotube made by the above described synthesis method includes large amounts of various kinds of impurities, which lowers electron emission characteristics of the electron emission source. Thus, a purification method for impurity removal may follow a synthesis method of a carbon nanotube. The purification method may be selected from various conventional methods, such as ultrasonic washing, centrifugation, chemical precipitation, filtering, chromatography, etc.

The present invention also provides an electron emission source including a carbon nanotube in which a difference between a thermal decomposition initiation temperature and a thermal decomposition termination temperature is less than or equal to approximately 250° C. or less.

The electron emission source of the present invention may be fabricated by directly growing a carbon nanotube on a substrate using a method such as chemical vapor deposition or by pasting the carbon nanotube on the substrate using a paste composition containing a carbon nanotube. The paste method is advantageous over the direct growth method with respect to mass production and fabrication cost.

With respect to fabrication of an electron emission source using the paste method, the electron emission source of the present invention may include one or more of an adhesive component and a sintered resultant of the adhesive component. The adhesive component enhances adhesion between a carbon nanotube and a substrate. An inorganic adhesive component may include glass frit, silane, and water glass. An organic adhesive component may include cellulosic resins such as ethyl cellulose and nitro cellulose; acrylic resins such as polyester acrylate, epoxy acrylate, and urethane acrylate; and vinyl resins. A metal with a low melting point may also be used as the adhesive component.

Another embodiment of the invention provides an electron emission device including a substrate; a cathode provided on the substrate; and an electron emission source electrically coupled with the cathode and including a carbon nanotube in which a difference between a thermal decomposition initiation temperature and a thermal decomposition termination temperature is less than or equal to 250° C. or less.

FIG. 1 is a partial sectional view illustrating an electron emission device having a triode structure according to an embodiment of the invention.

Referring to FIG. 1, an electron emission device 200 includes an upper plate 201 and a lower plate 202. The upper plate 201 includes an upper substrate 190, an anode 180 formed on a lower surface 190a of the upper substrate 190, and a phosphor layer 170 formed on a lower surface 180a of the anode 180.

The lower plate 202 includes a lower substrate 110 disposed substantially parallel to and separated from the upper substrate 190 by a predetermined distance to define an internal space, a cathode 120 disposed in a substantially stripe pattern on the lower substrate 110, a gate electrode 140 disposed in a substantially stripe pattern that intersects with the cathode 120, an insulating layer 130 provided between the gate electrode 140 and the cathode 120, an electron emission hole 169 defined by the insulating layer 130 and the gate electrode 140, and an electron emission source 160 provided lower than the gate electrode 140 in the electron emission hole 169 and electrically coupled with the cathode 120.

The upper plate 201 and the lower plate 202 are maintained at a pressure lower than atmospheric pressure, i.e. in a vacuum. A spacer 192 is provided between the upper plate 201 and the lower plate 202 to support the upper plate 201 and the lower plate 202 and define an emission space 210.

The anode 180 provides a high voltage necessary for electrons emitted from the electron emission source 160 to accelerate and collide with the phosphor layer 170 at high speed. The phosphor layer 170, when excited by the electrons, emits visible light when falling from high energy level to low energy level. With respect to an electron emission device for creating color images, a red phosphor layer, a green phosphor layer, and a blue phosphor layer together constituting a unit pixel are provided on the lower surface 180a of the anode 180 in each 210 of a plurality of emission spaces 210.

The gate electrode 140 allows electrons to easily emit from the electron emission source 160. The insulating layer 130 defines the electron emission hole 169 and insulates the electron emission source 160 from the gate electrode 140.

The electron emission source 160 that emits electrons under an electric field is an electron emission source having a difference between a thermal decomposition initiation temperature and a thermal decomposition termination temperature of less than or equal to 250° C.

According to an embodiment of the invention, there is provided a method of manufacturing an electron emission device, including preparing a composition for electron emission source formation having a carbon nanotube with a difference between a thermal decomposition initiation temperature and a thermal decomposition termination temperature of less than or equal to 250° C. and a vehicle; printing the composition for electron emission source formation; sintering the composition for electron emission source formation; and activating the resultant sintered product.

A method of manufacturing an electron emission device according to an embodiment of the invention is described below.

A composition for electron emission source formation is prepared, which includes a carbon nanotube and a vehicle.

The carbon nanotube is responsible for electron emission. As described above, a carbon nanotube may be used which has a difference between a thermal decomposition initiation temperature and a thermal decomposition termination temperature of less than or equal to 250° C. The carbon nanotube may be used in an approximate amount of 0.1 to 30 wt %, and preferably approximately 5 to 20 wt %.

The vehicle adjusts the viscosity and printability of the composition for electron emission source formation. The vehicle includes a polymer component or an organic solvent component.

The polymer component in the vehicle include, but are not limited to, cellulosic resins such as ethyl cellulose and nitro cellulose; acrylic resins such as polyester acrylate, epoxy acrylate, and urethane acrylate; and vinyl resins. The polymer component may be used in an amount of approximately 5 to 60 wt %, based on the total weight of the composition for electron emission source formation.

The organic solvent component in the vehicle may include, but are not limited to, butyl carbitol acetate (BCA), terpineol (TP), toluene, texanol, and butyl carbitol (BC). The organic solvent component may be used in an amount of approximately 40 to 80 wt %, based on the total weight of the composition for electron emission source formation.

The composition for electron emission source formation may include an adhesive component to improve adhesion between the carbon nanotube and a substrate. The adhesive component may be one or more selected from a group consisting of an inorganic adhesive component, an organic adhesive component, and a low melting point metal.

The composition for electron emission source formation may further include a filler, a photosensitive resin, a viscosity modifier, a resolution enhancer, etc. The filler improves conductivity of the carbon nanotube that may be insufficiently attached to the substrate and may include Ag, Al, Pd, etc. The photosensitive resin is used to print the composition for electron emission source formation according to an area intended for electron emission source formation.

The composition for electron emission source formation may further include a photosensitive monomer; a photoinitiator; a photosensitive resin such as polyester acrylate; a non-photosensitive polymer such as cellulose, acrylate, and a vinyl polymer; a dispersant; a defoamer, etc.

The photosensitive monomer may be used as a pattern dissolution enhancer, and may include a thermally decomposable acrylate monomer, benzophenone monomer, acetophenone monomer, or thioxanthone monomer. The photosensitive monomer may be used in an amount of approximately 3 to 40 wt %.

The photoinitiator may be a conventional photoinitiator and may be used in an amount of approximately 0.05 to 10 wt %.

The composition for electron emission source formation with the above composition may have a viscosity of approximately 5,000 to 50,000 cps.

The composition for electron emission source formation discussed above is then printed on a substrate. The term "substrate" refers to a substrate intended for electron emission source formation and may be a conventional substrate.

The printing method varies according to a presence or an absence of a photosensitive resin in the composition for electron emission source formation. When the composition for electron emission source formation includes a photosensitive resin, a photoresist pattern does not need to be formed. That is, a composition for electron emission source formation having a photosensitive resin is print-coated on a substrate, exposed and developed according to a desired pattern for an electron emission source. When no photosensitive resins are included in the composition for electron emission source formation, a photolithography process using a photoresist film pattern is required. That is, after a photoresist film pattern is formed from a photoresist film, a composition for electron emission source formation is printed using the photoresist film pattern.

The printed composition for electron emission source formation is then sintered to improve adhesion between the carbon nanotube and the substrate. In addition, durability may be improved and outgasing may be decreased by melting and solidification of at least a portion of the adhesive component.

The sintering temperature is determined according to the temperature and time for evaporation of the vehicle and sintering of the adhesive component in the composition for electron emission source formation. Generally, the sintering may be performed at a temperature of approximately 350 to 500° C., and preferably approximately 450° C. When the sintering temperature is less than approximately 350° C., evaporation of the vehicle may be insufficient. When the sintering temperature is greater than approximately 500° C., the carbon nanotube may be damaged.

The resultant sintered product is then activated to form an electron emission source. For example, the activation may be performed by coating the resultant sintered product with a polyimide polymer-containing surface treatment agent that may be cured as a film by heating, followed by heating and delamination of a film formed by the heating. Alternatively, the activation may be performed by a rolling process, e.g., forming an adhesive portion on a surface of a roller driven by a driving source and pressing the resultant sintered product with the roller under a predetermined pressure. Through the activation, the carbon nanotube may be exposed on a surface of the electron emission source or the carbon nanotube may be adjusted so that it is vertically aligned.

The present invention is described below using examples. However, it is understood that the following Examples are provided only for illustrative purposes.

Preparation of Carbon Nanotubes

Figure 4:
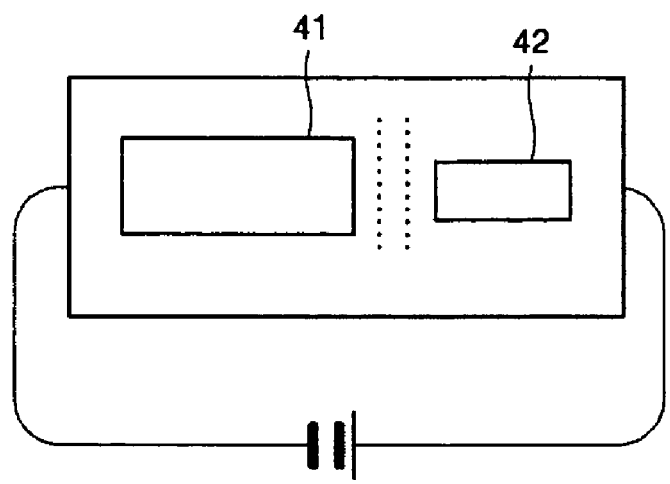
FIG. 4 is a schematic view illustrating the structure of an electric discharge apparatus for producing carbon nanotubes according to an embodiment of the present invention by an electric discharge method.

Example 1: Preparation of Carbon Nanotubes Using a Multi-Walled Carbon Nanotube $H_2$ Arc Sample Carbon nanotubes according to an embodiment of the invention were prepared by an electric discharge method. FIG. 4 schematically illustrates the structure of an electric discharge apparatus performing the electric discharge method. According to the electric discharge method, two graphite or metal bars are used as a cathode 41 and an anode 42. A direct current power is applied between the two electrodes to induce discharge between the two electrodes. A $H_2$ gas is used as a discharge gas.

A large amount of electrons generated by the discharge travel to and collide with the anode 42. Carbon crusts detach from the anode 42 when the electrons collide with the anode 42 and condense on a surface of the cathode 41 that was maintained at a low temperature, to prepare carbon nanotubes.

Comparative Example 1: Preparation of Carbon Nanotubes Using a Multi-Walled Carbon Nanotube He Arc Sample Carbon nanotubes were prepared in the same manner as in Example 1 except that a He gas was used as a discharge gas.

Comparative Example 2

A Co/Y catalyst was supported on a zeolite support using a Co acetate solution to obtain a catalytic metal for growth of carbon nanotubes. The final content of Co was approximately 2.5 wt %. Carbon nanotubes were grown on the catalytic metal using an acetylene gas as a carbon supply gas. The carbon nanotube growth temperature was set to approximately 700 to 800° C. The carbon supply gas was supplied together with a hydrogen gas used as a dilution gas to adjust the growth rate and time of the carbon nanotubes.

Figure 2A:
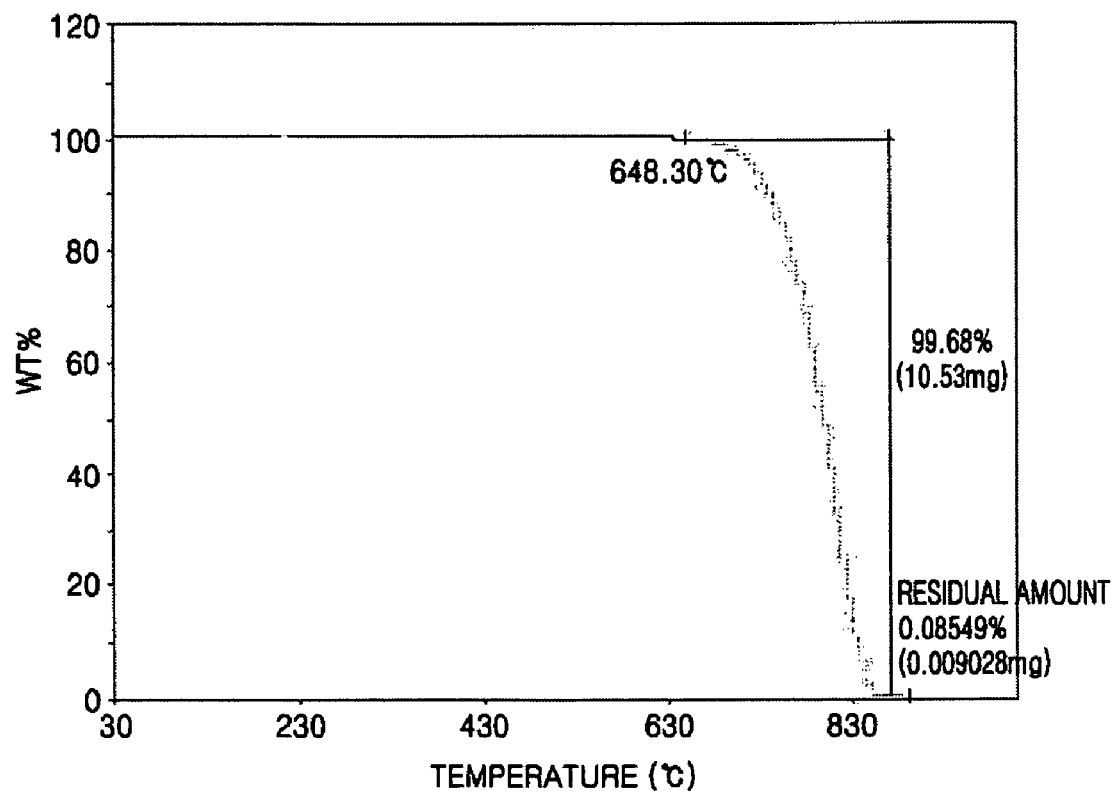
FIGS. 2A, 2B, and 2C are graphs illustrating a thermal decomposition (wt %) of carbon nanotubes according to an embodiment of the present invention (FIG. 2A) and conventional carbon nanotubes (FIGS. 2B and 2C) with respect to a thermal decomposition temperature, and a thermal decomposition initiation temperature and a thermal decomposition termination temperature.
Figure 2B:
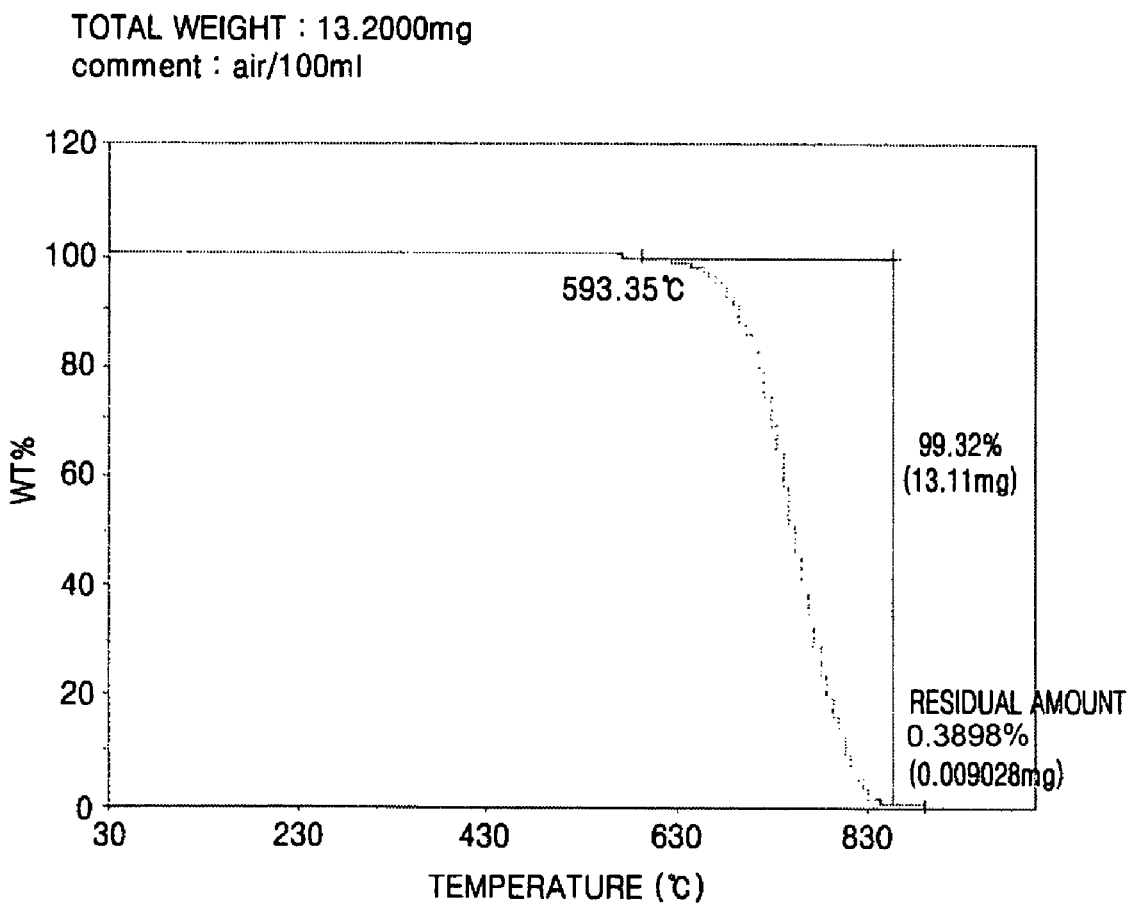
Figure 2C:
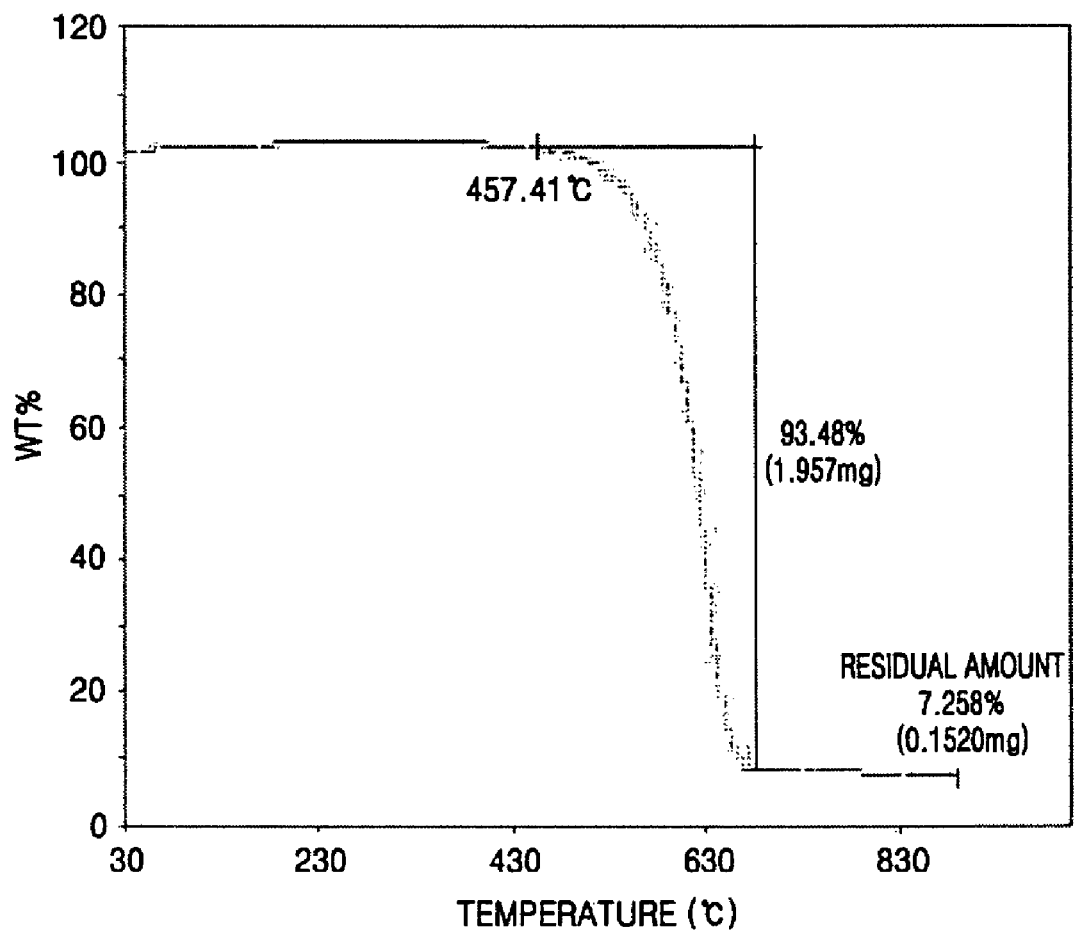

Thermal decomposition (wt %) with temperature, thermal decomposition initiation temperature, and thermal decomposition termination temperature for the carbon nanotubes according to Example 1 and Comparative Examples 1 and 2 are illustrated in FIGS. 2A, 2B, and 2C. Table 1 presents the thermal decomposition initiation temperatures and residual amounts at 886.93° C. for the carbon nanotubes according to Example 1 and Comparative Examples 1 and 2.

TABLE 1

| Sample | Initial amount (wt %) and thermal decomposition initiation temperature (° C.) | Residual amount (wt %) at 886.93° C. |
|---|---|---|
| Example 1 | 99.68 wt % 648.30° C. | 0.08549 wt % |
| Comparative Example 1 | 99.32 wt % 593.35° C. | 0.3898 wt % |
| Comparative Example 2 | 93.48 wt % 457.41° C. | 7.258 wt % |

As shown in Table 1, the carbon nanotubes of Example 1 exhibited a higher thermal decomposition initiation temperature as compared to the carbon nanotubes of Comparative Examples 1 and 2. Also, the residual amount of the carbon nanotubes of Example 1 was 0.08549 wt % at 886.93° C., which was much lower than that Comparative Example 1 (0.3898 wt %) and Comparative Example 2 (7.258 wt %). It is shown in Table 1 that the carbon nanotubes of Example 1 exhibit a smaller difference between a thermal decomposition initiation temperature and a thermal decomposition termination temperature, and therefore, have a higher purity compared to the carbon nanotubes of Comparative Examples 1 and 2.

Formation of Electron Emission Sources

Example 2

The carbon nanotubes prepared in Example 1, in which a difference between a thermal decomposition initiation temperature and a thermal decomposition termination temperature was less than or equal to approximately 250° C., glass frit, ethyl cellulose, methyl acrylic acid butyl carbitol acetate were mixed together to prepare a composition for electron emission source formation having a viscosity of approximately 25,000 cps. The composition was coated on a substrate and exposed to light using a pattern mask and parallel exposure equipment with an exposure energy of approximately 2,000 mJ/cm². The exposed resultant was developed by spraying and then sintered at approximately 450° C. to obtain electron emission sources.

Comparative Example 3

Electron emission sources were formed in the same manner as in Example 2 except that the carbon nanotubes prepared in Comparative Example 1 were used.

Comparative Example 4

Electron emission sources were formed in the same manner as in Example 2 except that the carbon nanotubes prepared in Comparative Example 2 were used.

Current Density Measurements

Figure 3:
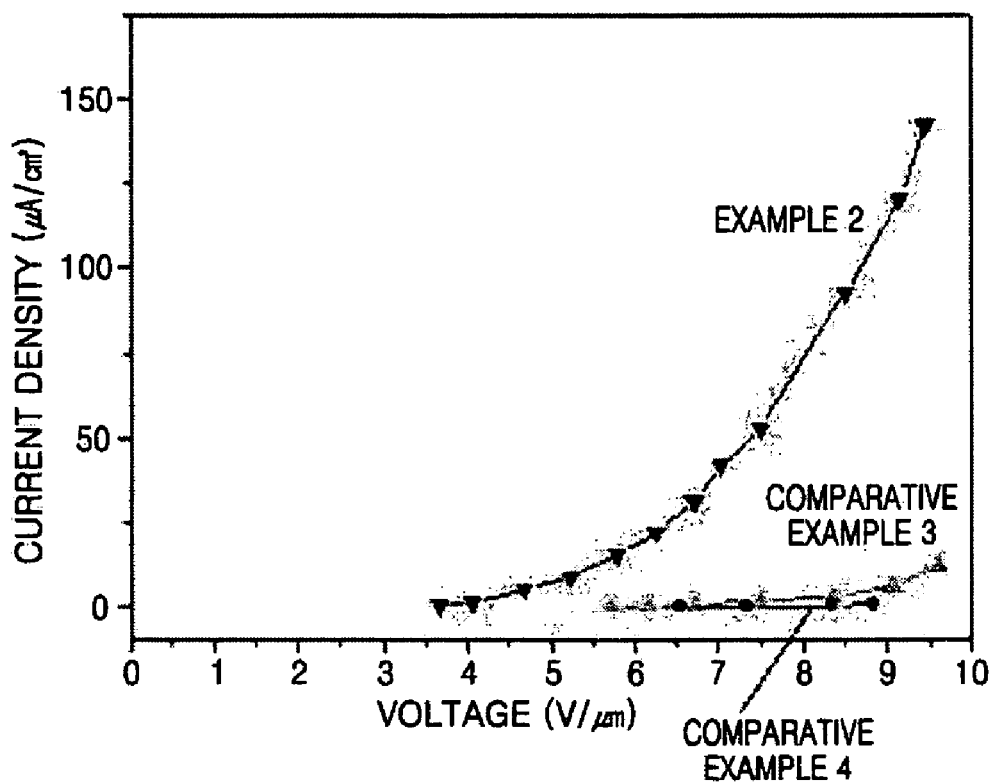
FIG. 3 is a graph illustrating a current density with respect to voltage for electron emission sources including carbon nanotubes according to an embodiment of the present invention and electron emission sources including conventional carbon nanotubes.

Current densities for the electron emission sources of Example 2, Comparative Example 3 and Comparative Example 4 were measured and the results are shown in FIG. 3. As shown in FIG. 3, a current density gradient of the electron emission sources according to the present invention is steeper than that of the electron emission sources according to Comparative Example 3 and Comparative Example 4.

Fabrication of Electron Emission Devices

Lower substrates were prepared. Cathodes made of a transparent indium tin oxide (ITO) material were formed in a substantially stripe pattern on the lower substrates. A polymide insulating material was then screen-printed on the cathodes to form insulating layers. A paste containing a conductor such as silver (Ag), copper (Cu), and aluminum (Al) was screen-printed on the insulating layers to form gate electrodes. The gate electrodes and the insulating layers were then etched so that surfaces of the cathodes were exposed to define electron emission holes. The gate electrodes were patterned in a substantially stripe shape by a photolithography process to intersect with the cathode electrode patterns.

A paste for electron emission source formation, having carbon nanotubes in which a difference between a thermal decomposition initiation temperature and a thermal decomposition termination temperature was less than or equal to approximately 250° C. and vehicles, was then coated in the electron emission holes to form electron emission sources. The resultant structure was sintered and activated to manufacture electron emission devices.

According to at least the embodiments of the invention discussed above, there is provided a carbon nanotube in which a difference between a thermal decomposition initiation temperature and a thermal decomposition termination temperature is small, thereby enabling the carbon nanotube to have good purity, which improves the electron emission properties of the carbon nanotube. Furthermore, the carbon nanotube has a high thermal decomposition initiation temperature and good heat resistance as compared with conventional carbon nanotubes.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A plurality of carbon nanotubes having a difference between a thermal decomposition initiation temperature and a thermal decomposition termination temperature of less than or equal to 250° C., wherein each of the plurality of carbon nanotubes comprises a combination of a support structure and a catalytic metal, the combination having an iron or cobalt composition of 2.5% by weight.

2. The carbon nanotubes of claim 1, wherein the thermal decomposition initiation temperature of the carbon nanotubes is 400° C. or greater.

3. The carbon nanotubes of claim 1, wherein the carbon nanotubes are made by a method selected from a group consisting of electric discharge, laser deposition, vaporization, thermal chemical vapor deposition, and plasma enhanced chemical vapor deposition.

4. The carbon nanotubes of claim 3, wherein the carbon nanotubes are made by an arc discharge using a hydrogen gas.

5. An electron emission source comprising the carbon nanotubes of claim 1.

6. The electron emission source of claim 5, wherein the electron emission source is formed by a direct growth of the carbon nanotubes on a substrate or by a paste method using a paste composition comprising the carbon nanotubes.

7. The carbon nanotubes of claim 1, wherein the carbon nanotubes are multi-walled carbon nanotubes.

8. The carbon nanotubes of claim 1, wherein the thermal decomposition initiation temperature of the carbon nanotubes is 648.30° C. or greater.

9. The carbon nanotubes of claim 1, wherein the support structure comprises a zeolite support structure.

10. The carbon nanotubes of claim 1, wherein the combination comprises a Cobalt-Yttrium catalyst and an Iron-Yttrium catalyst.

11. An electron emission device, comprising:
a substrate;
a cathode provided on the substrate; and
an electron emission source electrically coupled with the cathode formed on the substrate and comprising a plurality of carbon nanotubes having a difference between a thermal decomposition initiation temperature and a thermal decomposition termination temperature of less than or equal to 250° C., wherein each of the plurality of carbon nanotubes comprises a combination of a support structure and a catalytic metal, the combination having an iron or cobalt composition of 2.5% by weight.

12. The electron emission device of claim 7, wherein the carbon nanotubes are multi-walled carbon nanotubes.

13. The electron emission device of claim 11, wherein the support structure comprises a zeolite support structure.

14. The electron emission device of claim 11, wherein the combination comprises a Cobalt-Yttrium catalyst and an Iron-Yttrium catalyst.

* * * * *